United States Patent
Odaka et al.

(10) Patent No.: US 9,121,542 B2
(45) Date of Patent: Sep. 1, 2015

(54) ROTATION SUPPORT MECHANISM AND LASER DEVICE

(71) Applicant: J. Morita Manufacturing Corporation, Kyoto (JP)

(72) Inventors: Masaki Odaka, Kyoto (JP); Yoshihide Okagami, Kyoto (JP)

(73) Assignee: J. Morita Manufacturing Corporation, Kyoto (JP)

( * ) Notice: Subject to any disclaimer, the term of this patent is extended or adjusted under 35 U.S.C. 154(b) by 136 days.

(21) Appl. No.: 13/776,311

(22) Filed: Feb. 25, 2013

(65) Prior Publication Data

US 2013/0221184 A1 Aug. 29, 2013

(30) Foreign Application Priority Data

Feb. 23, 2012 (JP) ................................ 2012-037129

(51) Int. Cl.
  *E04G 3/00* (2006.01)
  *F16M 13/02* (2006.01)
  *F16M 11/10* (2006.01)
  *F16M 11/20* (2006.01)

(52) U.S. Cl.
  CPC ............... *F16M 13/02* (2013.01); *F16M 11/10* (2013.01); *F16M 11/2014* (2013.01); *F16M 2200/041* (2013.01)

(58) Field of Classification Search
  CPC ... F16M 11/04; F16M 11/2092; F16M 11/24; F16M 11/2014; F16M 2200/022; F16M 3/02; A61B 8/00; A61B 8/08; A61B 19/26; A61B 18/22; A61B 18/20

USPC ......... 248/593, 372.1, 274.1, 292.13, 280.11, 248/281.11, 284.1, 297.11; 219/121.6, 219/121.11, 121.78; 606/19
  See application file for complete search history.

(56) References Cited

U.S. PATENT DOCUMENTS

| | | | | |
|---|---|---|---|---|
| 4,473,074 A | * | 9/1984 | Vassiliadis | 606/19 |
| 4,623,229 A | * | 11/1986 | Galan | 359/845 |
| 4,896,015 A | * | 1/1990 | Taboada et al. | 219/121.78 |
| 7,014,157 B2 | * | 3/2006 | Oddsen | 248/280.11 |
| 2003/0001056 A1 | * | 1/2003 | Ihalainen et al. | 248/276.1 |
| 2007/0080275 A1 | * | 4/2007 | Stachowski et al. | 248/323 |
| 2013/0289548 A1 | * | 10/2013 | Hamada et al. | 606/16 |

FOREIGN PATENT DOCUMENTS

JP  7-051285 A  2/1995

* cited by examiner

*Primary Examiner* — Todd M Epps
(74) *Attorney, Agent, or Firm* — Osha Liang LLP

(57) ABSTRACT

The object is to provide a rotation support mechanism capable of adjusting a load acting on an inclinable and rotatable arm section to improve the operability of the arm section. The rotation support mechanism supports a protect pole with respect to a device main body such that the protect pole is inclinable and rotatable about a rotation axis as a rotation center. The rotation support mechanism includes a tensile spring for supplying the protect pole with a rotation urging force for directing the protect pole from an inclined state toward a most upright state in accordance with the inclination angle of the protect pole about the rotation axis as the rotation center, and also includes a cam surface for adjusting the rotation urging force to a desired rotation urging force in accordance with the inclination angle.

11 Claims, 12 Drawing Sheets

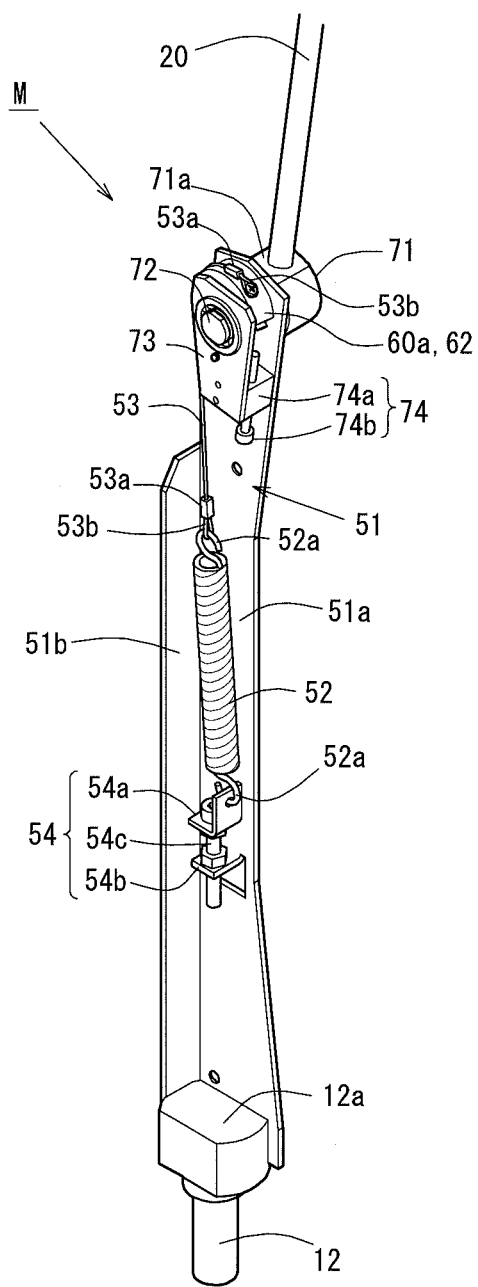
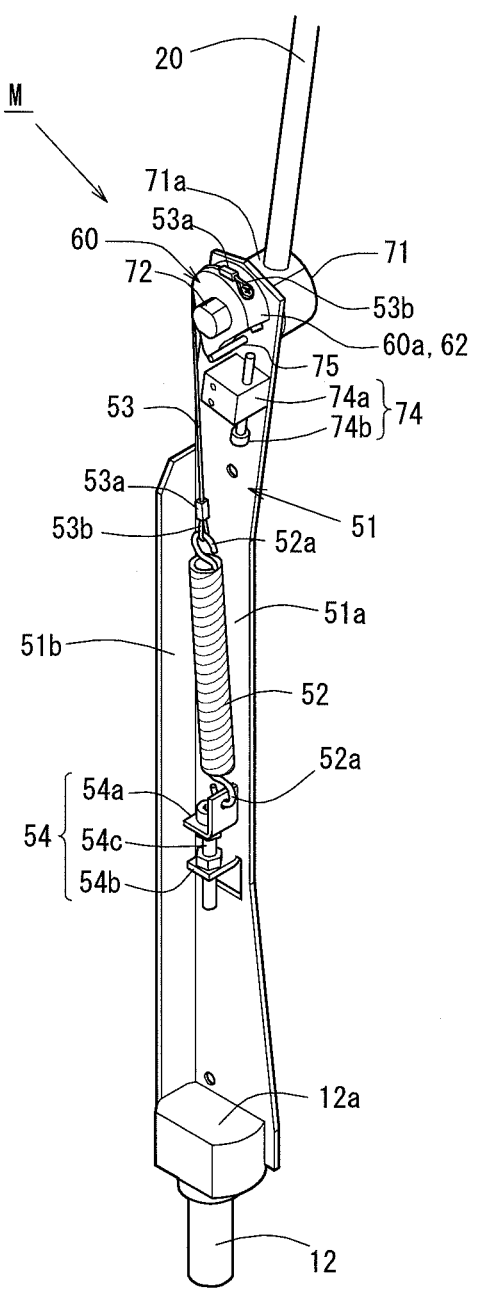

MOST UPRIGHT STATE (82 DEGREES)

MOST INCLINED STATE (40 DEGREES)

STATE OF MOST INCLINED-SIDE PART OF USING RANGE (50 DEGREES)

STATE OF INTERMEDIATE PART OF USING RANGE (57 DEGREES)

STATE OF MOST UPRIGHT-SIDE PART OF USING RANGE (60 DEGREES)

ROTATION SUPPORT MECHANISM AND LASER DEVICE

BACKGROUND OF THE INVENTION

1. Field of the Invention

The present invention relates a rotation support mechanism for supporting an arm section of a housing of, for example, a laser device for performing medical care such as laser treatment or the like, such that the arm section is inclinable and rotatable about a rotation shaft as a rotation center, and a laser device including such a rotation support mechanism.

2. Description of the Prior Art

For example, a laser device for performing medical care such as laser treatment or the like includes a flexible and lengthy lightguide path such as an optical fiber or the like for guiding laser light from a housing to a medical care tool (hand piece) provided at a tip of the lightguide path.

When such a hand piece-type tool attached to the tip of such a flexible and lengthy lightguide path is used, there is a problem that a load by the elasticity or weight of the lengthy lightguide path acts on the tool and this imposes a load on a user, and thus makes it difficult to perform a precise work or a long-time work.

In order to solve this problem, Patent Document 1 proposes a laser device including a support member for supporting a lengthy lightguide section such as a lightguide laser fiber or the like. The support member includes a bending section pivotable by an external force acting on the lightguide section. It is described that this structure allows the lightguide section to be brought to an area for treatment with a small force for operating a treating tool attached to a tip of the lightguide section.

However, in order to obtain a region in which the treating tool attached to the tip is usable, the lengthy lightguide path needs to be extended by a prescribed length from a portion thereof which is supported by the support member as described in Patent Document 1. With the structure described in Patent Document 1, the load acting on the tool due to the elasticity or weight of the lengthy lightguide path of the portion extended from the support member is not sufficiently alleviated.

There is also a case where the support member having a bent section is used as the arm section and a tool to be used is attached to a tip of the arm section, instead of the tip of the lengthy lightguide path. Even in such a case, the weight of the arm section acts on the tool, and thus a sufficient operability cannot be provided by merely having the bent section.

PRIOR ART DOCUMENT

Patent Document

Patent Document 1: Japanese Laid-Open Patent publication No. Hei 7-51285

SUMMARY OF THE INVENTION

Problems to be Solved by the Invention

Thus, the present invention made in light of the above-described problem, has an object of providing a rotation support mechanism capable of adjusting a load acting on an inclined arm section to improve the operability.

Solutions for the Problems

The present invention is directed to a rotation support mechanism for supporting an arm section with respect to a housing such that the arm section is inclinable and rotatable about a rotation axis as a rotation center. The rotation support mechanism includes an urging section for supplying the arm section with a rotation urging force for directing the arm section from an inclined state toward an upright state in accordance with an inclination angle of the arm section about the rotation axis as the rotation center; and an urging force adjusting section for adjusting the rotation urging force to a desired rotation urging force in accordance with the inclination angle.

The rotation support mechanism for supporting the arm section with respect to the housing such that the arm section is inclinable and rotatable about the rotation axis as the rotation center may have a structure of directly supporting the arm section by the housing such that the arm section is inclinable and rotatable about the rotation axis as the rotation center, or a structure of supporting the arm section via a support base attached to the housing such that the arm section is inclinable and rotatable.

The urging section may be an urging section for causing a rotation urging force to act on the arm section for directing the arm section from the inclined state toward the upright state by an urging force exerted in a direction in which the urging section contracts when being pulled in accordance with the inclination and rotation motion, an urging section for causing the rotation urging force to act on the arm section by twisting caused by the inclination and rotation motion, or the like.

According to the present invention, the load acting on the inclined arm section is adjusted by the rotation urging force which is adjusted by the urging force adjusting section, and thus the operability can be improved.

In more detail, on the rotation support mechanism for supporting the arm section such that the arm section is inclinable and rotatable about the rotation axis as the rotation center, a load component, of a load such as the weight of the inclined arm section or the like, which is perpendicular to the inclination direction of the arm section acts as a rotation moment.

When the rotation urging force supplied to the arm section by the urging section is larger than the rotation moment supplied by the inclined arm section, the urging force for directing the arm section from the inclined state toward the upright direction acts on the arm section. By contrast, when the rotation urging force supplied to the arm section by the urging section is smaller than the rotation moment supplied by the inclined arm section, the load in the inclined direction acts on the arm section.

The rotation moment supplied by the inclined arm section generally increases in the manner of a generally sin-shaped curve or a generally cos-shaped curve in accordance with the inclination angle. Therefore, it is difficult to make the rotation urging force supplied by the urging section balanced with the rotation moment. However, the urging force adjusting section can adjust the rotation urging force to the desired rotation urging force in accordance with the inclination angle, and allows the rotation urging force supplied by the urging section to be balanced with the rotation moment. Therefore, for example, an extra load does not act on the tool attached to the tip, and thus the operability can be improved.

In an embodiment of the present invention, the urging section may include a pulling and urging member which includes, at least in a part thereof, a pulling and urging section having an urging force increasing in proportion to a tensile amount. One of two ends of the pulling and urging member may be located on the side of one of the arm section and the housing, and the other of the two ends of the pulling and urging member may be located on the side of the other of the arm section and the housing. The urging force adjusting section may include a cam which is rotatable about the rotation axis as the rotation center along with an inclination and rotation motion of the arm section and which has a cam surface along which a part of the pulling and urging member in a length direction from the one end to the other end is extended, wherein the tensile amount of the pulling and urging member is adjusted in accordance with an eccentric distance of the cam surface from the rotation axis and thus the rotation tensile force of the pulling and urging member is adjusted.

The pulling and urging member may include a pulling and urging section such as a coil spring or an elastic member such as a rubber strip or the like, which has a tensile force increasing in accordance with the tensile amount, and a coupling member attached to the pulling and urging section. Alternatively, the pulling and urging member may be a single body of the pulling and urging section.

The eccentric distance of the cam surface from the rotation axis is the distance from the rotation axis to the cam surface in a rotation plane which rotates about the rotation axis.

According to the present invention, the rotation tensile force can be adjusted with certainty in accordance with the inclination angle with a simple structure.

This will be described in more detail. The pulling and urging member includes, in at least a part thereof, the pulling and urging section having an urging force increasing in proportion to the tensile amount. One end of the pulling and urging member is located on the side of one of the arm section and the housing, and the other end of the pulling and urging member is located on the side of the other of the arm section and the housing. Therefore, the pulling and urging member can be allowed to follow the inclination and rotation motion of the arm section.

The cam, rotatable about the rotation axis as the rotation center in accordance with the inclination and rotation motion of the arm section, has a cam surface having an eccentric distance from the rotation axis. Therefore, the eccentric distance of the cam surface, rotating about the rotation axis as the rotation center in accordance with the inclination and rotation motion of the arm section, is changed.

A part of the pulling and urging member in a length direction from one end to the other end is extended along the cam surface having the eccentric distance changing in accordance with the inclination and rotation motion of the arm section. Therefore, the tensile amount of the pulling and urging member is adjusted in accordance with the inclination and rotation motion of the arm section, and thus the rotation tensile force of the pulling and urging member can be adjusted.

Therefore, the eccentric distance in accordance with the inclination angle of the arm section is adjusted in accordance with the desired rotation tensile force to be caused to act on the arm section, so that the rotation tensile force in accordance with the inclination angle can be caused to act on the arm section with certainty.

Thus, the rotation urging force to be caused to act on the arm section is balanced with the rotation moment supplied by the inclination of the arm section which increases in accordance with the inclination angle, in the manner of, for example, a generally sin-shaped curve or a generally cos-shaped curve, with a simple structure. Therefore, an extra load does not act on the tool attached to the tip, and thus the operability can be improved.

In an embodiment of the present invention, the cam surface of the cam may include at least one of a rotation tensile force decreasing section, the eccentric distance of which from the rotation axis is formed to be shorter than a prescribed radius of a reference circle centered around the rotation axis and thus the tensile amount of the pulling and urging member is made smaller than a tensile amount by the reference circle, so that the rotation tensile force is made smaller than a reference rotation tensile force which is in accordance with the inclination angle based on the reference circle; and a rotation tensile force increasing section, the eccentric distance of which from the rotation axis is formed to be longer than the radius of the reference circle and thus the tensile amount of the pulling and urging member is made larger than the tensile amount by the reference circle, so that the rotation tensile force is made larger than the reference rotation tensile force.

The cam surface, having the eccentric distance shorter or longer than the prescribed radius of the reference circle centered around the rotation axis, is realized by, for example, making the center of the cam reference circle, which forms the cam, eccentric with respect to the rotation axis or by matching the center of the cam reference circle to the rotation axis, namely, by matching the cam reference circle to the reference circle. Even in such a case, the eccentric distance of the cam surface in accordance with the inclination and rotation angle of the cam may be made shorter or longer, or may be a combination thereof.

According to the present invention, the desired rotation tensile force to be caused to act on the arm section can be caused act on the arm section appropriately.

This will be described in more detail. The cam surface includes at least one of the rotation tensile force decreasing section and the rotation tensile force increasing section. The eccentric distance of the rotation tensile force decreasing section from the rotation axis is formed to be shorter than the prescribed radius of the reference circle centered around the rotation axis, and thus the tensile amount of the pulling and urging member is made smaller than the tensile amount by the reference circle. Therefore, the rotation tensile force is made smaller than the reference rotation tensile force which is in accordance with the inclination angle based on the reference circle. The eccentric distance of the rotation tensile force increasing section from the rotation axis is formed to be longer than the radius of the reference circle, and thus the tensile amount of the pulling and urging member is made larger than the tensile amount by the reference circle. Therefore, the rotation tensile force is made larger than the reference rotation tensile force. In this manner, the rotation tensile force adjusted in accordance with the inclination and rotation angle of the arm section can be caused to act on the arm section.

In an embodiment of the present invention, the rotation support mechanism may further include a reference tensile force adjusting section for adjusting a length of the pulling and urging member with respect to a natural length thereof to adjust a reference tensile force of the pulling and urging member.

Owing to this structure, for example, the reference tensile force acting as the reference for the rotation tensile force can be adjusted in advance in accordance with the situation.

This will be described in more detail. The reference tensile force adjusting section can adjust the length of the pulling and urging member with respect to the natural length thereof, so that the reference tensile force of the pulling and urging member can be adjusted. Therefore, the adjustable range of the rotation urging force can be adjusted to a desired adjusting range by the urging force adjusting section.

Therefore, for example, the rotation tensile force adjusted in accordance with the inclination and rotation angle of the arm section may be roughly adjusted in advance in accordance with the situation, and thus a more appropriate desired rotation tensile force can be caused to act on the arm section.

In an embodiment of the present invention, the rotation support mechanism may further include an inclination range regulation section for regulating an inclination range of the arm section.

According to the present invention, an appropriate rotation urging force adjusting section is realized. This will be described in more detail. The range in which the rotation urging force is adjustable by the urging force adjusting section is preliminarily matched to the inclination range of the arm section. Thus, the rotation urging force can be appropriately adjusted in accordance with the inclination angle of the arm section by the urging force adjusting section.

The present invention is directed to a laser device including the housing as a laser device main body for accommodating a laser light source. The arm section includes a holding arm section for holding a flexible and lengthy lightguide section which is for transmitting laser light emitted from the laser light source to a tip of the lightguide section; and the above-described rotation support mechanism supports the holding arm section with respect to the laser device main body such that the holding arm section is inclinable and rotatable.

The laser light directed from the laser light source may be appropriate laser light such as Er:YAG laser light, carbon dioxide laser light or the like.

The lengthy lightguide path may be, for example, a flexible and lengthy lightguide path formed of glass fiber or the like covered with a covering member. In more detail, the lengthy lightguide path may be a hollow lightguide path or the like formed as follows. A tubular member is formed of a material having a smooth surface such as glass or the like. An inner wall of the tubular member is covered with a reflective film formed of silver or the like. An inner surface of the reflective film is covered with a dielectric thin film formed of a material having a high transmission efficiency such as cyclic olefin polymer, polyimide or the like.

According to the present invention, the lengthy lightguide path can be directed toward a site to be irradiated with laser light, with no extra load. Thus, the operability can be improved.

In an embodiment of the present invention, the laser device may further include a laser medical care tool at a tip of the lightguide section, the laser medical care tool being for performing laser medical care by laser light irradiation. When the holding arm section is in an inclination angle range during use of the laser medical care tool, the cam surface may have a balance adjusting section for adjusting the rotation tensile force to be larger or smaller than the reference rotation tensile force in accordance with a balance between the rotation tensile force and a weight of the laser medical care tool, so that an extra rotation tensile force does not act on the laser medical care tool.

The laser medical care tool usable for laser medical care may be a tool usable for diagnosis or treatment performed by use of laser light.

According to the present invention, the operator can direct the laser medical care tool toward the site for medical care with no extra load. Thus, the operability can be improved.

This will be described in more detail. The cam surface has a balance adjusting section for adjusting the rotation tensile force to be larger or smaller than the reference rotation tensile force in accordance with the balance between the rotation tensile force and a weight of the laser medical care tool. The cam surface includes the balance adjusting section such that, when the holding arm section is in an inclination angle range during use of the laser medical care tool, an extra rotation tensile force does not act on the laser medical care tool. Thus, for example, when the operator grasps and operates the laser medical care tool, an extra load due to the rotation urging force acting on the arm section is prevented from acting on the laser medical care tool via the lengthy lightguide path. Therefore, even during a precise operation or a long-time operation, the load on the operator can be reduced, and accurate medical care can be performed.

In an embodiment of the present invention, in the case where a state where the holding arm section is in a generally upright state with respect to the laser device main body is a reference state, the cam surface may have the rotation tensile force increasing section as a recovery rotation tensile force increasing section for, when the holding arm section is in a prescribed range of inclination angles from the generally upright state, making the rotation tensile force, for recovering the holding arm section from an inclined state to the generally upright state, larger than the reference rotation tensile force.

According to the present invention, for example, after an operation performed by use of the laser medical care tool, the laser medical care tool is moved to a position in the vicinity of the storage position in order to store the laser medical care tool at the storage position. Thus, the recovery rotation tensile force increasing section for making the rotation tensile force, for recovering the holding arm section from the inclined state to the generally upright state, larger than the reference rotation tensile force acts on the holding arm section. As a result, the holding arm section can be recovered to the generally upright state semi-automatically, and the operability can be improved.

In an embodiment of the present invention, the cam surface may have the rotation tensile force increasing section as a rising rotation tensile force increasing section for, when the holding arm section is in a prescribed range of inclination angles from a state in the vicinity of a most inclined state in an inclination direction, making the rotation tensile force in a rising direction larger than the reference rotation tensile force.

According to the present invention, the following is made possible. It is assumed that, for example, during an operation performed by use of the laser medical care tool, the laser medical care tool falls from the hand of the operator, and a drastic load in a falling direction acts on the holding arm section via the lengthy lightguide path. Even in this case, the holding arm section is put from the most inclined state in the falling direction into the prescribed range of inclination angles. As a result, the rotation tensile force in the rising direction is made larger than the reference rotation tensile force by the rising rotation tensile force increasing section, and thus drastic fall of the holding arm section can be prevented.

Therefore, the tensile force may be caused to act on the laser medical care tool, which has fallen from the hand of the operator, via the lengthy lightguide path. Thus, the impact caused by, for example, collision of the laser medical care tool against the floor can be nullified or alleviated.

In an embodiment of the present invention, the cam surface may include the recovery rotation tensile force increasing section, the balance adjusting section, and the rising rotation tensile force increasing section in this order from a rotation start direction to a rotation termination direction.

According to the present invention, the following is made possible. The following ranges are set in correspondence with the angle of inclination of the holding arm section. A range which is from a generally upright state of the holding arm section to a state where the holding arm section is inclined at a prescribed angle is a range in which the holding arm section is automatically recovered to the generally upright state from an inclined state. A range which is from the vicinity of the most inclined state of the holding arm section to the state where the holding arm section is inclined at the prescribed angle is a range in which the impact acting on the laser medical care tool when the laser medical care tool falls is alleviated, namely, a range in which the rising rotation tensile force is increased. A range between the range in which the holding arm section is automatically recovered and the range in which the impact is alleviated is a medical care range in which the rotation moment acting on the holding arm section and the rotation tensile force are balanced, such that the laser medical care tool can be moved around with no extra load being applied thereto. Thus, the operability of the laser device is improved.

In an embodiment according to the present invention, the holding arm section may include a bendable member having a bending deformability improved from a base end toward a tip thereof; and the rotation tensile force decreasing section may be included in at least a part of the balance adjusting section.

The bendable member having the bending deformability improved from the base end toward the tip thereof is formed of the same material from the base end to the tip thereof. Alternatively, the bendable member may be formed of a material having a cross-sectional strength changing from the base end toward the tip thereof, a material having a material strength changing from the base end toward the tip thereof, or a material having both of the cross-sectional strength and the material strength changing from the base end toward the tip thereof. The bendable member having the bending deformability improved from the base end toward the tip thereof may have the bending deformability improved gradually from the base end toward the tip thereof. Alternatively, the holding arm section has such a bendable member at a plurality positions at an interval, such that the bending deformability of the holding arm section is improved from the base end toward the tip thereof gradually as a whole.

The expression "the rotation tensile force decreasing section is included in at least a part of the balance adjusting section" represents a concept encompassing various combinations of patterns including, for example, the following patterns: a pattern in which the balance adjusting section includes the rotation tensile force decreasing section at one position or at a plurality of positions; a pattern in which the balance adjusting section includes the rotation tensile force decreasing section together with the rotation tensile force increasing section and/or the rising rotation tensile force increasing section; and a pattern in which the balance adjusting section includes the rotation tensile force decreasing section between the rotation tensile force increasing section and the rising rotation tensile force increasing section.

According to the present invention, the extra load acting on the laser medical care tool can be further decreased.

This will be described in more detail. Since the holding arm section includes the bendable member having the bending deformability improved from the base end toward the tip thereof, the shape of bending changes in accordance with the inclination angle of the holding arm section. In the case where the holding arm section is formed of a material which is not bendable, the rotation moment acting on the rotation support mechanism is changed in the manner of a generally sin-shaped curve, namely, a curve convexed outward. By contrast, in the case of this embodiment, the rotation moment acting on the rotation support mechanism is changed in the manner of a generally cos-shaped curve, namely, a curve convexed inward. The rotation tensile force decreasing section is provided at a position at which the rotation tensile force changing linearly in proportion to the tensile length becomes larger than the rotation moment changing in the manner of the cos-shaped curve. Thus, the rotation tensile force can be appropriately adjusted in accordance with the inclination angle of the holding arm section.

In an embodiment of the present invention, the laser device may further include an arm connection base on a top surface of the laser device main body, the arm connection base having the rotation support mechanism at a tip thereof and connected to the holding arm section via the rotation support mechanism; and the arm connection base may be rotatable in a generally horizontal direction with respect to the top surface of the laser device main body.

According to the present invention, the operability can be further improved by the rotation of the arm connection base in a generally horizontal direction with respect to the top surface of the laser device main body, in addition to the operability with respect to the inclination direction of the holding arm section being improved.

Effect of the Invention

According to the present invention, a rotation support mechanism capable of adjusting a load acting on an inclined arm section to improve the operability can be provided.

BRIEF DESCRIPTION OF DRAWINGS

FIGS. 4A and 4B provide isometric views of the rotation support base seen through the cover.

DESCRIPTION OF THE PREFERRED EMBODIMENTS

Hereinafter, an embodiment of the present invention will be described with reference to the drawings.

Figure 1:
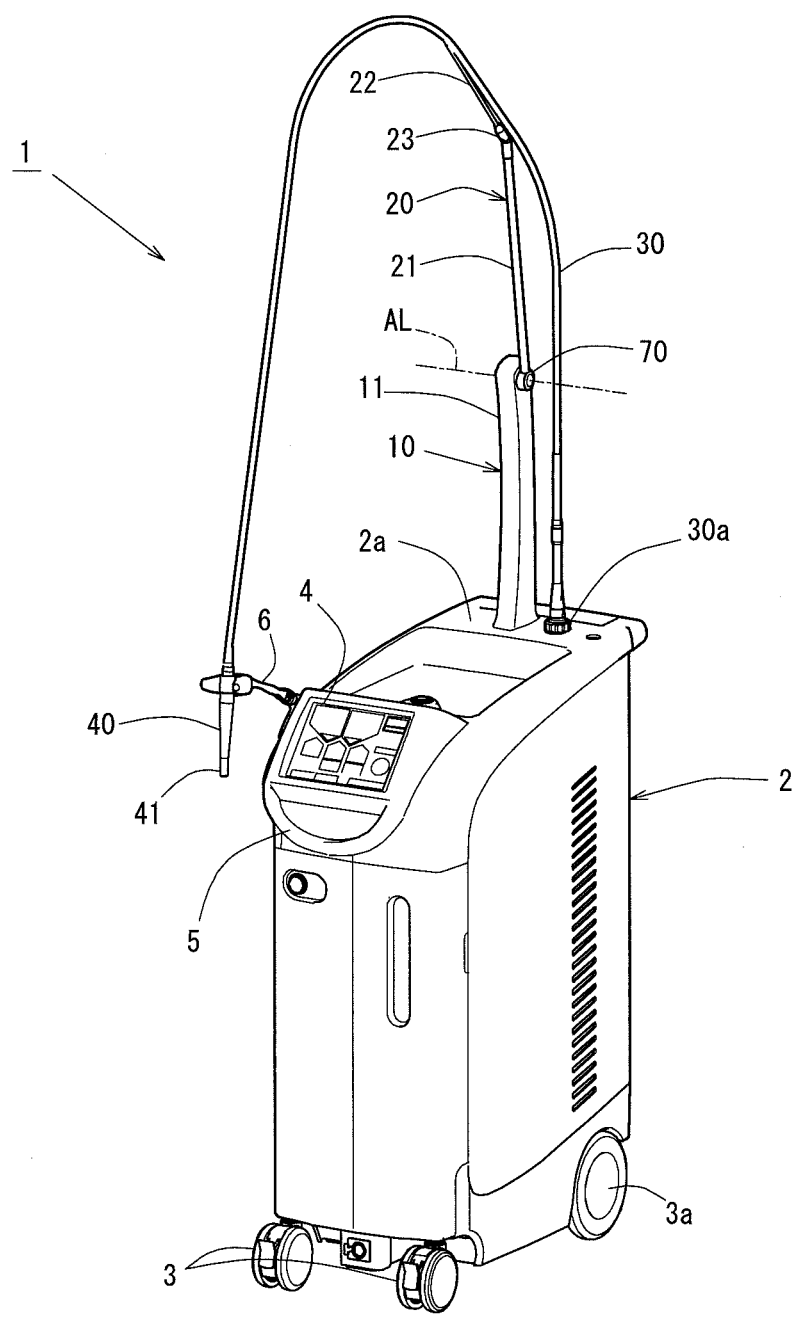
FIG. 1 is an isometric view of a laser device including a rotation support mechanism.
Figure 2:
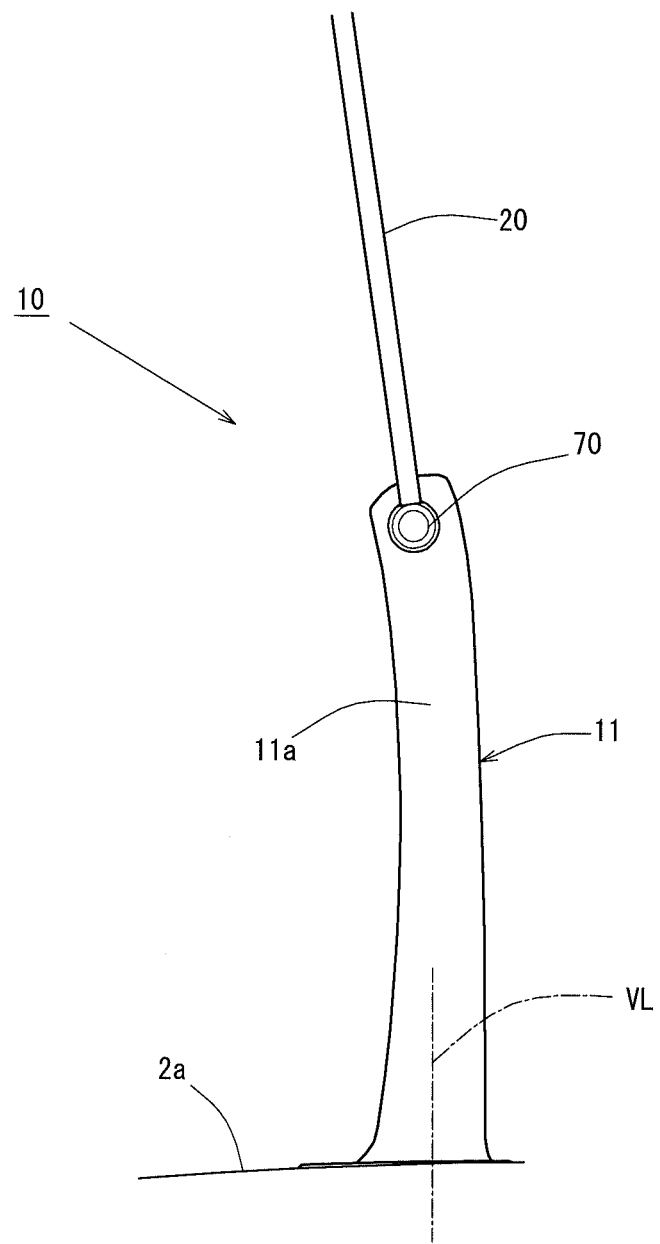
FIG. 2 is an enlarged right side view of a rotation support base.
Figure 3:
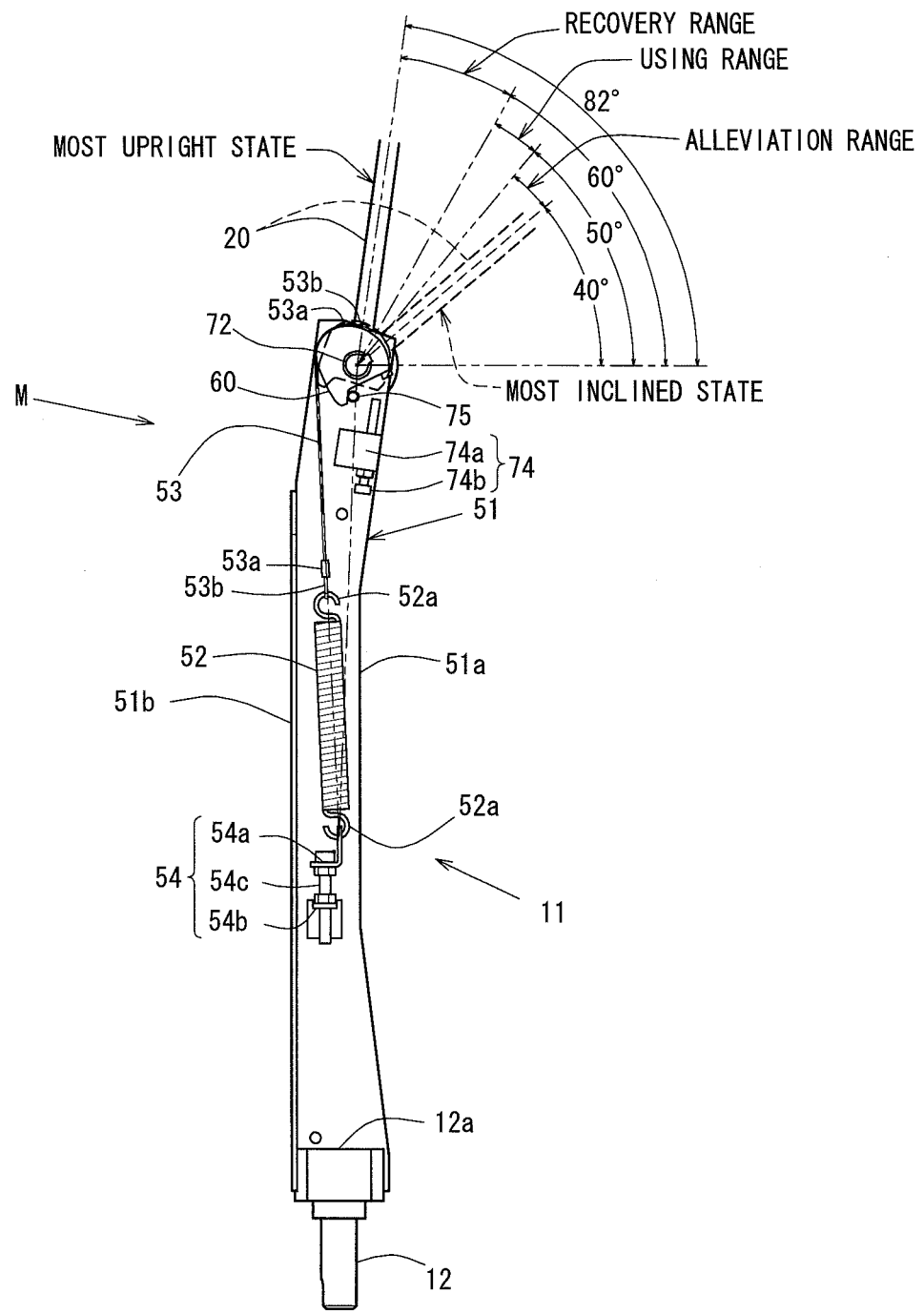
FIG. 3 is a left side view of the rotation support base seen through a cover.

FIG. 1 is an isometric view of a laser device 1 including a rotation support mechanism M. FIG. 2 is an enlarged right side view of a rotation support base 10. FIG. 3 is a left side view of the rotation support base 10 seen through a cover 11a. FIG. 4 provides isometric views of the rotation support base 10 seen through the cover 11a. FIG. 5 through FIG. 8 show an eccentric cam 60 in the rotation support mechanism M. FIG. 9 shows adjustment of a rotation tensile force in the rotation support mechanism M.

In more detail, FIG. 4(a) is an isometric view of the rotation support base 10 seen through a cover 11a. FIG. 4(b) is an isometric view of the rotation support base 10 seen through the cover 11a. In FIG. 4(b), a support plate 73 is removed to expose the eccentric cam 60.

Figure 6A:
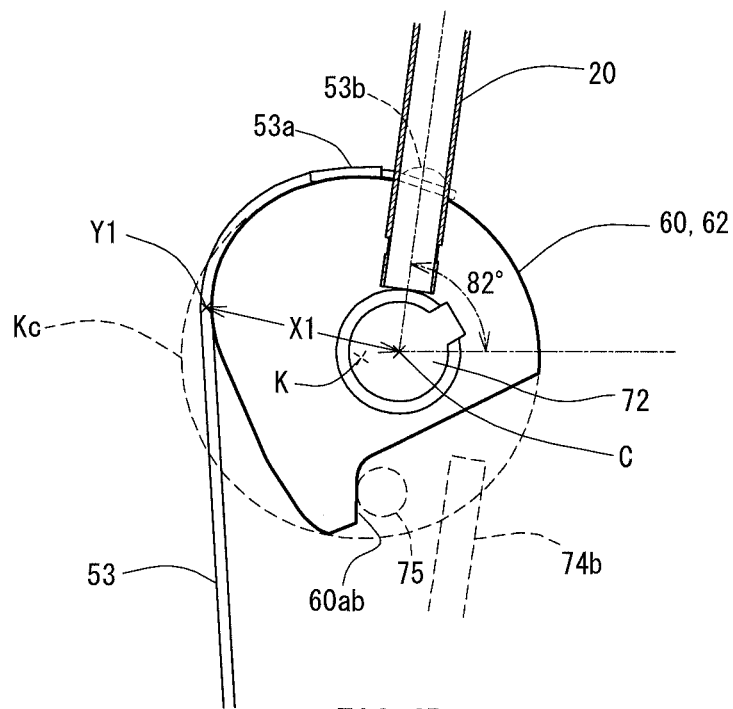
FIGS. 6A and 6B show the eccentric cam in the rotation support mechanism.
Figure 6B:
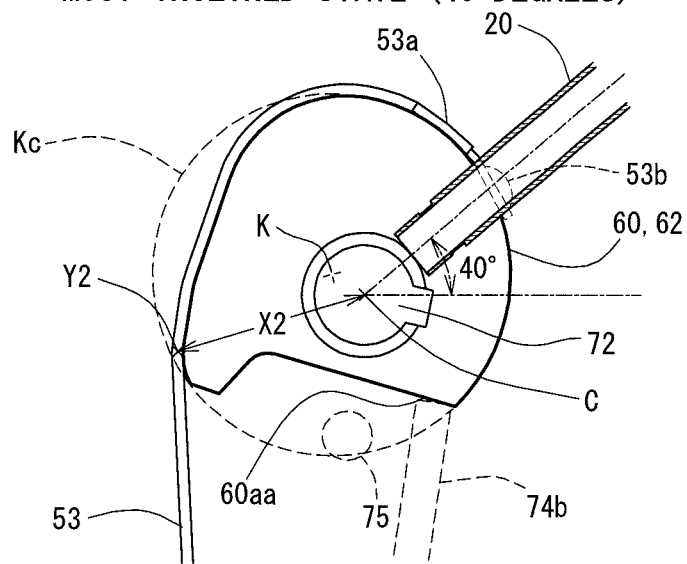
Figure 7A:
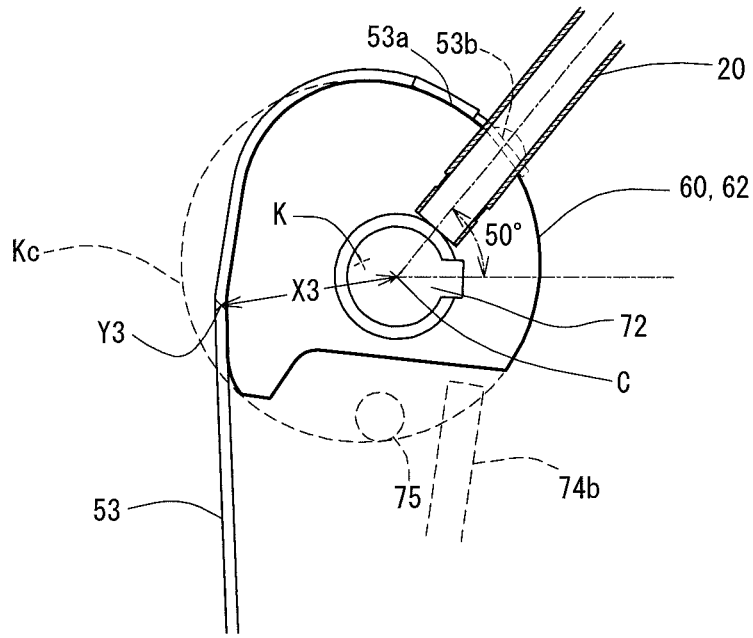
FIGS. 7A and 7B show the eccentric cam in the rotation support mechanism.
Figure 7B:
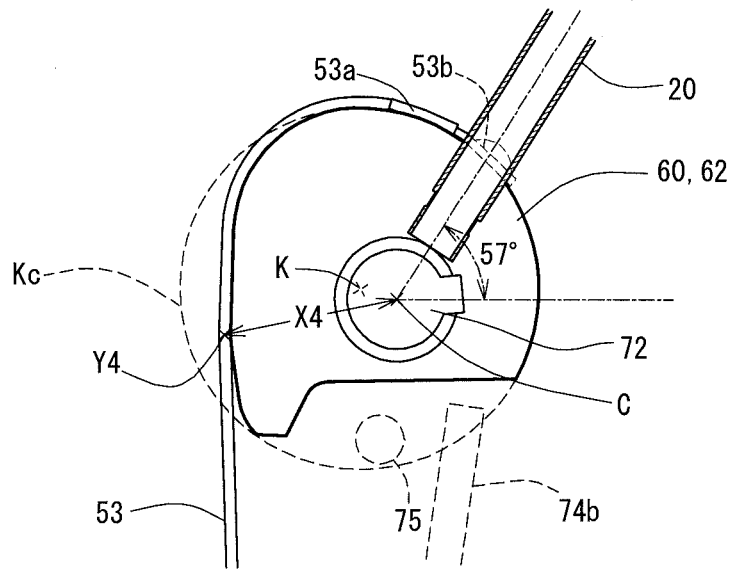
Figure 8A:
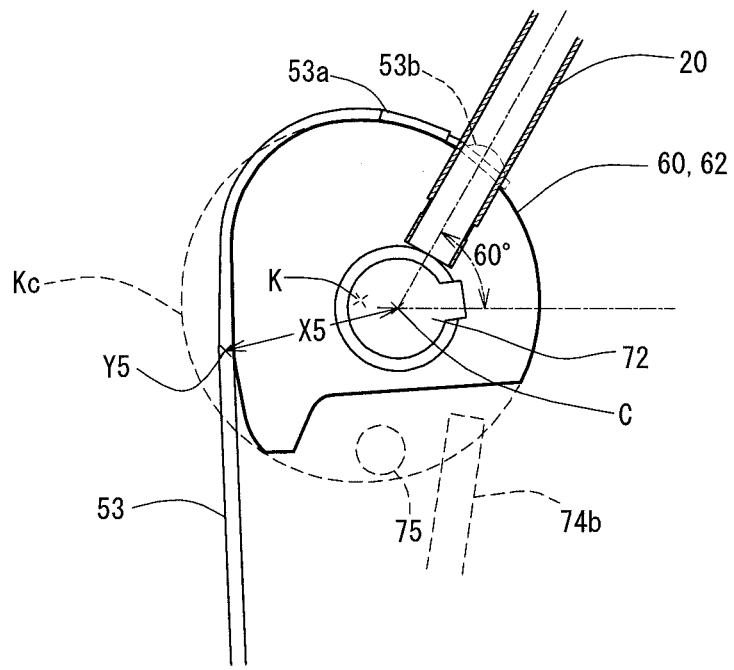
FIGS. 8A and 8B show the eccentric cam in the rotation support mechanism.
Figure 8B:
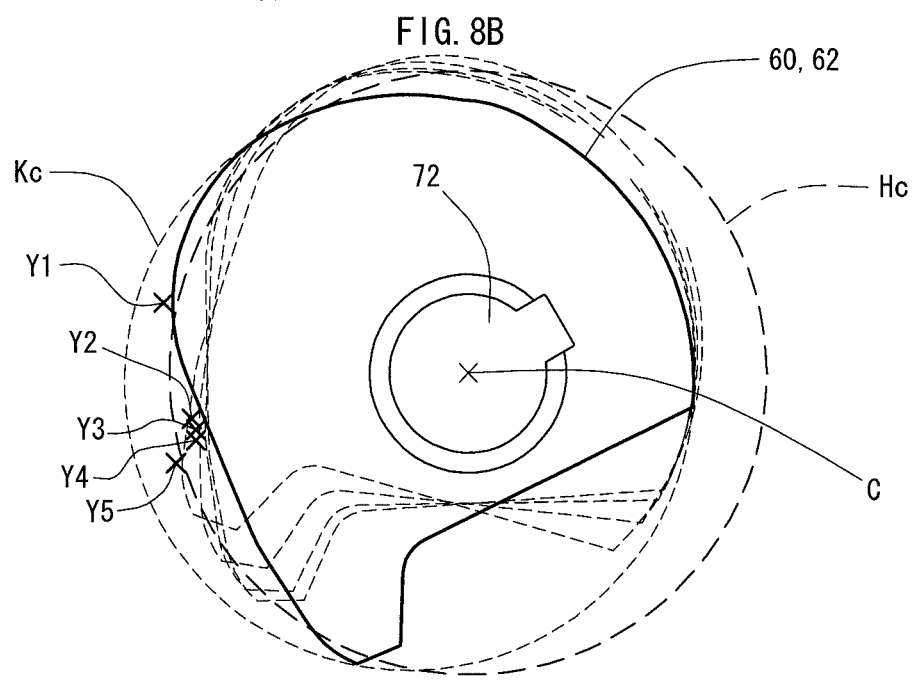

FIG. 6(a) is a left side view of the eccentric cam 60 when a protect pole 20 is in a most upright state, and FIG. 6(b) is a left side view of the eccentric cam 60 when the protect pole 20 is in a most inclined state. Similarly, FIG. 7(a) is a left side view of the eccentric cam 60 when the protect pole 20 is in a most inclined-side part of a using range, and FIG. 7(b) is a left side view of the eccentric cam 60 when the protect pole 20 is in an intermediate part of the using range. FIG. 8(a) is a left side view of the eccentric cam 60 when the protect pole 20 is in a most upright-side part of the using range, and FIG. 8(b) shows enlarged left side views of the eccentric cam 60 in above-described states in an overlapped manner.

Figure 9A:
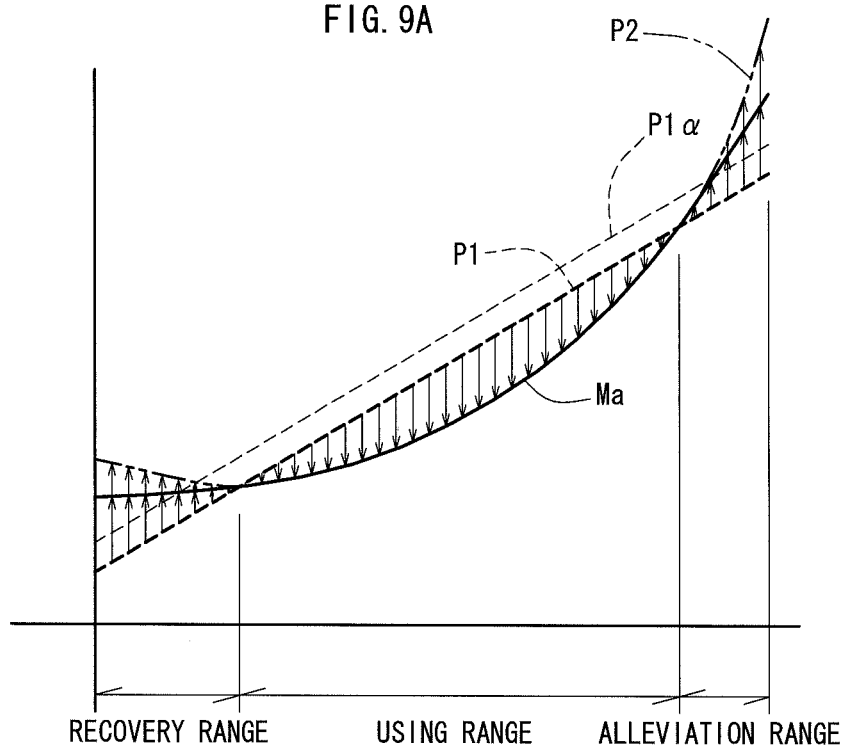
FIGS. 9A and 9B show adjustment of a rotation tensile force in the rotation support mechanism.
Figure 9B:
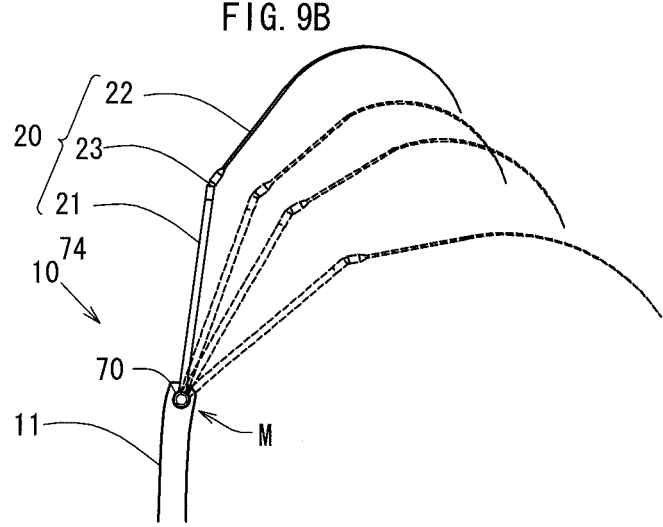

FIG. 9(a) is a graph showing a rotation moment Ma acting on the rotation support mechanism M, a reference tensile force P1, which is an urging force of the tensile spring 52 in the rotation support mechanism M, and an adjusted rotation tensile force P2 obtained as a result of adjusting the rotation tensile force based on the reference tensile force P1. FIG. 9(b) is an enlarged view of the protect pole 20.

The laser device 1 includes a device main body 2 for accommodating therein a laser light source (not shown) for generating laser light such as Er:YAG laser light or the like, the rotation support base 10 attached to a top surface 2a of the device main body 2 so as to be rotatable in a horizontal direction with respect to the top surface 2a of the device main body 2, the protect pole 20 inclinable and rotatable about a rotation axis AL as the rotation center with respect to the rotation support base 10, a lightguide cable 30 protruding upward from the top surface 2a and held by the protect pole 20 at a plurality of positions in an intermediate part thereof, and a hand piece 40 attached to a tip of the lightguide cable 30.

The device main body 2 is a parallelepiped housing which is long in a depth direction and a vertical direction and accommodates a laser light source (not shown) therein as described above. The device main body 2 has an inclined operation panel 4 provided on the top surface 2a on the side closer to the viewer of FIG. 1.

The laser device 1 includes casters 3a and casters 3 with stoppers below the device main body 2. Therefore, the device main body 2 can be easily moved to a desired position and secured at such a position with a user holding a handle 5 provided forward with respect to the operation panel 4.

The laser device 1 includes a holder 6, protruding forward from a side surface of the operation panel 4, for holding the hand piece 40 described later.

The lightguide cable 30 has a base 30a protruding vertically upward from a rear part of the top surface 2a of the device main body 2. The lightguide cable 30 is connected to the laser light source (not shown) inside the device main body 2. The lightguide cable 30 can guide the laser light generated by the laser light source to the handpiece 40 attached to the tip of the lightguide cable 30.

As described above, the lightguide cable 30 protruding vertically from the top surface 2a has a prescribed length and a prescribed flexibility. The lightguide cable 30 includes a cylindrical hollow waveguide path formed of a glass tube or the like having a smooth surface. An inner circumferential surface of the hollow waveguide path is covered with a dielectric thin film formed of an appropriate material which reflects and transmits the laser light efficiently, such as COP (cyclic olefin polymer), polyimide or the like.

The hand piece 40 attached to the tip of the lightguide cable 30 has a laser irradiation section 41 for directing laser light from a tip thereof. The hand piece 40 is a tool usable for performing medical care on a medical care area of a patient with the laser light directed from the laser irradiation section 41.

On the top surface 2a of the device main body 2, the rotation support base 10 is attached to the side of the base 30a of the lightguide cable 30.

The rotation support base 10 includes a base main body 11 which is generally arc-shaped as seen in a side view, an insertion shaft 12 protruding downward from a bottom surface of the base main body 11, and a hinge 70 included in the rotation support mechanism M having the rotation axis AL extending in a generally horizontal direction as the rotation center. The hinge 70 is located in the vicinity of a top end of the base main body 11. The rotation support base 10 is connected to the protect pole 20 via the hinge 70 such that the protect pole 20 is inclinable and rotatable.

The rotation support mechanism M is located inside a cover 11a included in the base main body 11. The rotation support base 10 having such a structure allows the insertion shaft 12 to be inserted into an attachment hole (not shown) formed in the top surface 2a of the device main body 2, and thus is attached to the device main body 2 so as to be rotatable in a horizontal direction about a vertical central shaft VL as the center of rotation.

The protect pole 20 connected to the rotation support base 10 via the hinge 70 to be inclinable and rotatable includes a base-side first pole portion 21 formed of steel and connected to the hinge 70, and a tip-side second pole portion 22 formed of glass fiber or the like and thus having flexibility. The tip-side second pole portion 22 is tapered, namely, has a diameter gradually decreasing, toward a tip thereof. The first pole portion 21 and the second pole portion 22 have a cushioning spring 23 therebetween. The cushioning spring 23 is formed of a coil spring and cushions a drastic force, such as a drastic tensile force, applied via the lightguide cable 30. The protect pole 20 having such a structure has a deformation performance which is gradually improved from the base side to the tip side.

The lightguide cable 30 is located along a length direction of the protect pole 20 having such a structure, and is attached to the protect pole 20 at a plurality of positions which are away from each other by a prescribed distance with clips (not shown).

Now, the rotation support mechanism M included in the rotation support base 10 will be described.

As shown in FIG. 3 and FIG. 4 showing the rotation support base 10 seen through the cover 11a, the rotation support mechanism M located inside the base main body 11 includes a frame 51, a tensile spring 52, a coupling wire 53, a tensile strength adjusting screw section 54, and the hinge 70 including the eccentric cam 60.

The frame 51 is formed of an angled member which is L-shaped in a plan view. In more detail, the frame 51 includes a first side plate 51a shaped in accordance with the shape of the base main body 11, which is generally arc-shaped as seen in a side view, and a second side plate 51b extending along a front side of the base main body 11. The frame 51 is provided with an insertion shaft base 12a at a bottom end thereof. The insertion shaft base 12a is attached as bridging an inner surface of the first side plate 51a and an inner surface of the second side plate 51b and forms a base of the insertion shaft 12.

The first side plate 51a protrudes upward from the second side plate 51b by a length of a portion to which the hinge 50 is attached.

The tensile spring 52 is a coil spring including engageable hooks 52a at both ends thereof. The upper engageable hook 52a is in engagement with a loop 53b of the coupling wire 53 (described later), and the lower engageable hook 52a is in engagement with an upper flange 54a of the tensile strength adjusting screw section 54 (described later).

The coupling wire 53 is a flexible metal wire and includes loops 53b at both ends thereof. Each end of the coupling wire 53 is formed into a U shape and caulked with a caulking fitting 53a to form the loop 53b. The lower loop 53b is in engagement with the engageable hook 52a of the tensile spring 52, and the coupling wire 53 extends along a side circumferential surface 60a of the eccentric cam 60. The upper loop 53b is secured by a screw to the side circumferential surface 60a of the eccentric cam 60 (described later).

The tensile strength adjusting screw section 54 includes the upper flange 54a which is L-shaped and is in engagement with the lower engageable hook 52a of the tensile spring 52, a lower flange 54b, and a coupling screw 54c for coupling the upper flange 54a and the lower flange 54b arranged in an up-down direction such that the gap between the upper flange 54a and the lower flange 54b is adjustable. The lower flange 54b is formed by cutting a part of the first side plate 51a which is below the upper flange 54a into a U shape with squared corners and folding this U shaped part internally to the frame 51 so that the U shaped part is generally horizontal.

In the tensile strength adjusting screw section 54 having such a structure, the lower flange 54b is positionally secured with respect to the first side plate 51a, and the upper flange 54a engaged with the engageable hook 52a is not positionally secured with respect to the first side plate 51a. Therefore, the position of the upper flange 54a with respect to the lower flange 54b can be adjusted by the coupling screw 54c being screwed in and out.

Therefore, the tensile spring 52 secured to the side circumferential surface 60a of the eccentric cam 60 via the coupling wire 53 is adjusted in length by the coupling screw 54c in the tensile strength adjusting screw section 54 being screwed in and out. Thus, the urging force of the tensile spring 52 in the most upright state of the protect pole 20, where the tensile spring 52 is contracted most, can be adjusted.

The hinge 70 includes the eccentric cam 60, a hinge base 71, a rotation shaft 72, a support plate 73, a maximum inclination angle adjusting section 74, and a maximum upright angle regulation section 75. The hinge base 71 is located outer to the first side plate 51a and has a generally cylindrical shape extending in the direction of the rotation axis AL. A side circumferential surface 71a of the hinge base 71 is connected to the base of the protect pole 20. The rotation shaft 72 passes through the first side plate 51a and the eccentric cam 60 from the first side plate 51 side of the hinge base 71 along the rotation axis AL. The support plate 73 supports a tip of the rotation shaft 72 on the opposite side to the first side plate 51a. The maximum inclination angle adjusting section 74 adjusts a maximum inclination angle of the protect pole 20. The maximum upright angle regulation section 75 regulates a maximum upright angle of the protect pole 20.

The rotation shaft 72 is generally cylindrical, and is inserted into the eccentric cam 60. A part of the rotation shaft 72 in a circumferential direction is in engagement with the eccentric cam 60 in a radial direction. Thus, relative rotation of the rotation shaft 72 and the eccentric cam 60 is regulated.

The hinge base 71, the rotation shaft 72 and the eccentric cam 60 are integrated together and are rotatable about the rotation axis AL as the rotation center.

The maximum inclination angle adjusting section 74 includes an adjusting table 74a attached to the first side plate 51a, and an adjusting bolt 74b passing through the adjusting table 74a in the up-down direction. The adjusting bolt 74b is screwed into and out of the adjusting table 74a. When the adjusting bolt 74b is screwed into the adjusting table 74a, a top end of the adjusting bolt 74b contacts a first regulation section 60aa of the side circumferential surface 60a of the eccentric cam 60 (described later). In this manner, the angle of the eccentric cam 60 when the protect pole 20 is in the most inclined state is adjustably regulated.

The maximum upright angle regulation section 75 is a pin for bridging the first side plate 51a and the support plate 73, and contacts a second regulation section 60ab of the first side circumferential surface 60a of the eccentric cam 60 described later. In this manner, the angle of the eccentric cam 60 when the protect pole 20 is in the most upright state is regulated.

Figure 5:
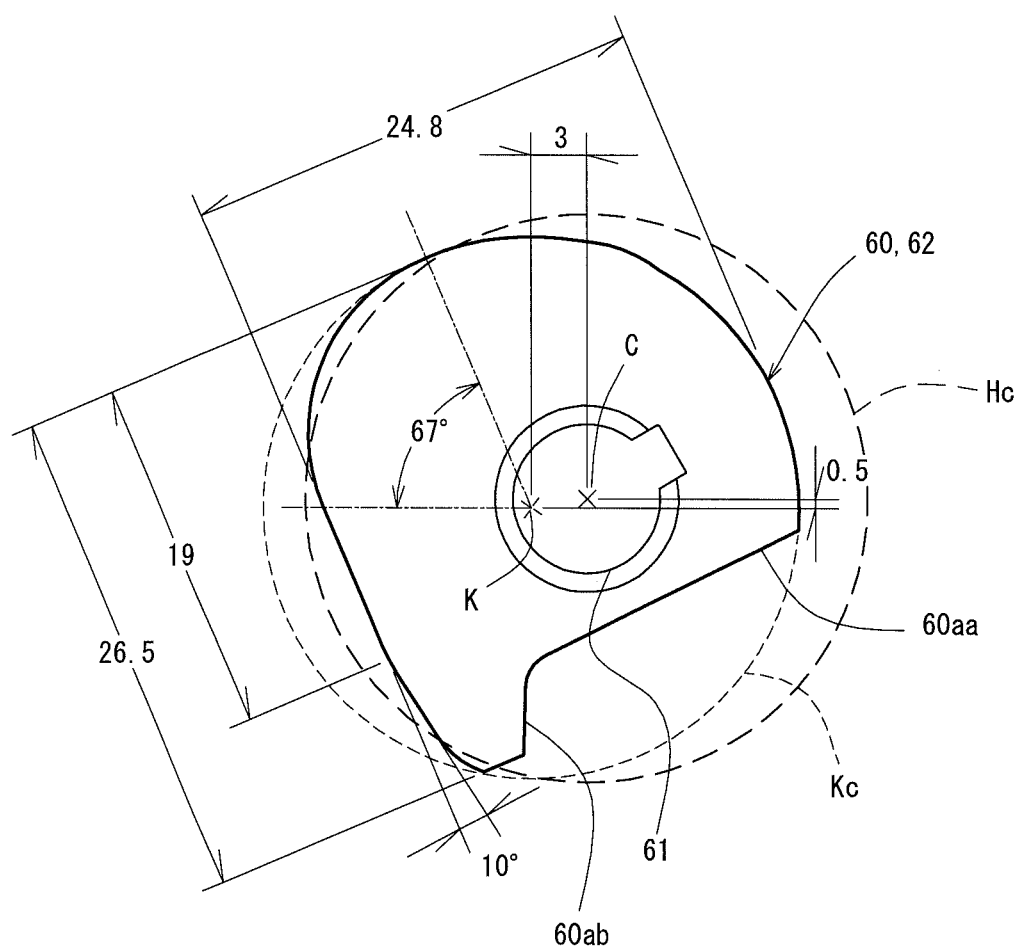
FIG. 5 is an enlarged left side view of an eccentric cam in the rotation support mechanism.

FIG. 5 is an enlarged left side view of the eccentric cam 60 in the rotation support mechanism M. As shown in FIG. 5, the eccentric cam 60 has an insertion hole 61 in the vicinity of the center thereof as seen in a side view. The rotation shaft 72 is allowed to be inserted into the insertion hole 61. The eccentric cam 60 allows the side circumferential surface 60a, along which the coupling wire 53 is extended, to act as a cam surface 62.

This will be described in more detail. As shown in FIG. 5, the most upright state in which the protect pole 20 attached to a side circumferential surface 71a of the hinge base 71 has an angle of 82 degrees with respect to the horizontal direction is set as an initial state. A phantom reference circle Kc centered around a phantom center K is set. The eccentric cam 60 has a part having an arc-shaped profile which is along a circumference of a part of the phantom reference circle Kc extending from the position of approximately 11 o'clock to the position of approximately 3 o'clock in a clockwise direction as seen in the left side view. The eccentric cam 60 also has a part having a generally L-shaped profile extending from the position of approximately 3 o'clock to the position of approximately 6 o'clock as seen in the left side view. In more detail, this profile includes a straight line extending from the position of approximately 3 o'clock in an obliquely leftward and downward direction and a straight line extending from the position of approximately 6 o'clock in an upward direction. The generally L-shaped profile is convexed inward in a radial direction.

The eccentric cam 60 further has a part having a generally L-shaped profile from the position of approximately 6 o'clock 20 to the position of approximately 7 o'clock as seen in the left side view. This part is smaller than the above-described part from the position of approximately 3 o'clock to the position of approximately 6 o'clock, and the profile of this part is convexed outward in the radial direction. The eccentric cam 60 still further has a part having a straight profile from the position of approximately 7 o'clock to the position of approximately 9 o'clock as seen in the left side view. The profile of this part is generally perpendicular to the straight line extending from the position of approximately 3 o'clock in the obliquely downward and leftward direction.

The eccentric cam 60 still further has a part having an arc-shaped profile from the position of approximately 9 o'clock to the position of approximately 11 o'clock as seen in the left side view. The arc-shaped profile of this part has a shorter radius than the radius of the phantom reference circle Kc.

Specifically, the eccentric cam 60 has the following shape in the initial state. The phantom reference circle Kc has a radius of about 14.4 mm. The arc-shaped profile of the part of the eccentric cam 60 having an angle of 113 degrees in a counterclockwise direction from the right half of the horizontal line passing the phantom center K is along the circumference of the phantom reference circle Kc. The arc-shaped profile of the part to the left thereof, namely, the part having an angle of 67 degrees, has a radius of about 10.5 mm. Herein, the lower end of this arc-shaped profile is referred to as the "left end", and the straight line from the left end to the phantom center K is referred to as the "left horizontal line". The straight profile extending from the left end has a length of about 9.4 mm and an angle of 67 degrees from the left horizontal line in the counterclockwise direction. The straight profile bending from the lower end thereof in the counterclockwise direction at an angle of 10 degrees has a length of about 4.8 mm. The short straight profile bending from the lower end thereof is perpendicular to the straight line having the length of about 9.4 mm. The straight profile bending from the right end thereof is extended upward toward the phantom center K. The long straight profile bending from the upper end thereof is perpendicular to the straight profile having the length of about 9.4 mm. These profiles are sequentially connected to form the cam surface 62.

As seen in the left side view, the rotation center C which the rotation axis AL passes is eccentric rightward by about 3 mm and upward by 0.5 mm with respect to the phantom center K. As described later in more detail, in the eccentric cam 60 rotatable about the rotation center C which the rotation axis AL passes, the distance from the rotation center C to the cam surface 62 is an eccentric length X.

The first regulation section 60aa is a part of the side circumferential surface 60a which is in the vicinity of a right end of the long straight line perpendicular to the straight profile having the length of about 9.4 mm. The second regulation section 60ab is the straight part of the side circumferential surface 60a which extends upward toward the phantom center K.

In the rotation support mechanism M having the above-described structure, the bottom end of the tensile spring 52 is secured to the first side plate 51a via the tensile strength adjusting screw 54. The upper engageable hook 52a of the tensile spring 52 is in engagement with the coupling wire 53. The coupling wire 53 is extended along an upper part of the side circumferential surface 60a of the eccentric cam 60, and the upper loop 53b of the coupling wire 53 is secured in the vicinity of an uppermost position of the side circumferential surface 60a of the eccentric cam 60.

Therefore, the protect pole 20 is inclined and rotated (clockwise direction in FIG. 6) from the most upright state (initial state) shown in FIG. 6(a). Along with the inclination and rotation motion of the protect pole 20, the eccentric cam 60 is rotated about the rotation axis AL. By the eccentric cam 60 rotated in this manner, the tensile spring 52 is pulled via the coupling wire 53. In other words, the tensile spring 52 pulled along with the inclination and rotation motion of the protect pole 20 has an urging force on the protect pole 20 for recovering the protect pole 20 to the most upright state via the hinge 70, namely, the rotation tensile force (force in the counterclockwise direction in FIG. 6).

The rotation tensile force at this point is in accordance with a tensile amount by which the tensile spring 52 is pulled via the coupling wire 53 extending along the cam surface 62, which is the side circumferential surface 60a of the eccentric cam 60. The cam surface 62 rotates about the rotation center C which is eccentric from the phantom center K of the phantom reference circle Kc for the cam surface 62. Therefore, the tensile amount changes in accordance with the inclination and rotation amount of the protect pole 20.

As described above, the cam surface 62 is formed of shapes different from the phantom reference circle Kc centered around the phantom center K. Therefore, the tensile amount changes in a complicated manner in accordance with the inclination and rotation amount of the protect pole 20.

This will be described specifically. FIG. 6(a) shows the most upright state (the protect pole 20 is at an angle of 82 degrees from the horizontal direction in the counterclockwise direction) regulated by the maximum upright angle regulation section 75. In this state, the coupling wire 53 is separated from the cam surface 62 and approaches the upper engageable hook 52a of the tensile spring 52 at the position of approximately 10 o'clock as seen in the left side view. The position of approximately 10 o'clock as seen in the left side view is tensile point Y1 in the cam surface 62. The distance between the tensile point Y1 and the rotation center C is eccentric distance X1 which influences the tensile amount by which the cam surface 62 pulls the tensile spring 52 via the coupling wire 53.

FIG. 6(b) shows the most inclined state (the protect pole 20 is at an angle of 40 degrees from the horizontal direction in the counterclockwise direction) adjusted by the maximum inclination angle adjusting section 74. In this state, the position of approximately 7:30 as seen in the left side view, which is opposite to the second regulation section 60ab, is tensile point Y2. The distance between the tensile point Y2 and the rotation center C is eccentric distance X2. In this embodiment, the maximum inclination angle adjusting section 74 adjusts the maximum inclination angle to be 40 degrees. Alternatively, the maximum inclination angle may be adjusted to an appropriate angle in accordance with the state of use of the hand piece 40.

FIG. 7(a) shows a state where the protect pole 20 is in the most inclined-side part of the using range (the protect pole 20 is at an angle of 50 degrees from the horizontal direction in the counterclockwise direction). In this state, a position in the vicinity of the bottom end of the long straight line having the length of 9.4 mm described above is the position of approximately 8:30 as seen in the left side view. This position is tensile point Y3, and the distance between the tensile point Y3 and the rotation center C is eccentric distance X3. FIG. 7(b) shows a state where the protect pole 20 is in the intermediate part of the using range (the protect pole 20 is at an angle of 57 degrees from the horizontal line in the counterclockwise direction). In this state, a position which is in the vicinity of the bottom end of the straight line, namely, in the vicinity of the position of approximately 8:30 as seen in the left side view, but is slightly below and inner to the tensile point Y3 is tensile point Y4. The distance between the tensile point Y4 and the rotation center C is eccentric distance X4. FIG. 8(a) shows a state where the protect pole 20 is in the most upright-side part of the using range (the protect pole 20 is at an angle of 60 degrees from the horizontal line in the counterclockwise direction). In this state, a position which is in the vicinity of the bottom end of the straight line, namely, in the vicinity of the position of approximately 8:30 as seen in the left side view, but is slightly below and outer to the tensile point Y4 is tensile point Y5. The distance between the tensile point Y5 and the rotation center C is eccentric distance X5.

As a result of an experiment of medical care performed by use of the laser device 1 and the hand piece 40, the protect pole 20 was often used in a range of an angle of 50 degrees to 60 degrees from the horizontal direction. Therefore, in this example, this range is set as the using range.

FIG. 8(b) shows the side views of the eccentric cam 60 in the initial state and various other states in an overlapped manner with the tensile points Y1 through Y5. The eccentric distance X1 corresponding to the tensile point Y1 and the eccentric distance X2 corresponding to the tensile point Y2 are long, whereas the eccentric distances X3 through X5 corresponding to the tensile points Y3 through Y5 are short. Among the eccentric distances X3 through X5 corresponding to the tensile points Y3 through Y5, the eccentric distance X4 corresponding to the tensile point Y4 is slightly shorter than the eccentric distances X3 and X5 corresponding to the tensile points Y3 and Y5.

Specifically, the eccentric distance X1 corresponding to the tensile point Y1 is as long as 15.2 mm, and the eccentric distance X2 corresponding to the tensile point Y2 is as long as 14.5 mm. The eccentric distance X3 corresponding to the tensile point Y3 is as short as 13.6 mm, the eccentric distance X4 corresponding to the tensile point Y4 is as short as 13.3 mm, and the eccentric distance X5 corresponding to the tensile point Y5 is as short as 13.5 mm.

As described above, the rotation tensile force of the tensile spring 52 changes in accordance with the rotation angle of the eccentric cam 60 rotatable along with the inclination and rotation motion of the protect pole 20 and also in accordance with the eccentric distance X between the cam surface 62 and the rotation center C. Therefore, the rotation tensile force of the tensile spring 52 is adjusted in accordance with the rotation angle of the eccentric cam 60 by use of the above-described shape of the cam surface 62.

A method for the adjustment will be described with reference to FIG. 9.

The rotation tensile force of the tensile spring 52 in accordance with the inclination angle of the protect pole 20 is adjusted based on the rotation moment Ma acting on the hinge 70. The rotation moment Ma is a logical product of an inclination angle perpendicular direction component, of a vertical load based on, for example, the weight of the protect pole 20 and the lightguide cable 30, which is perpendicular to the inclination angle and a length of the protect pole 20.

This will be described in more detail. When the rotation tensile force in the direction in which the protect pole 20 is recovered to the most upright state is larger than the rotation moment Ma acting on the hinge 70, the force for recovering the protect pole 20 to the most upright state acts on the protect pole 20. When the rotation tensile force is smaller than the rotation moment Ma, the force for inclining the protect pole 20 acts on the protect pole 20. When the rotation tensile force is equal to the rotation moment Ma, the protect pole 20 is maintained in the current inclined state, namely, in a balanced state.

In this embodiment, when the protect pole 20 is in a prescribed range of angles from the most upright state, the rotation tensile force is adjusted to be larger than the rotation moment Ma, so that the protect pole 20 is easily recovered to the most upright state. When the protect pole 20 is in a prescribed range of angles from the most inclined state also, the rotation tensile force is adjusted to be larger than the rotation moment Ma, so that the impact acting on the hand piece 40 when the hand piece 40 falls is nullified or alleviated. When the protect pole 20 is in the above-described using range, the rotation tensile force and the rotation moment Ma are adjusted to provide a balanced state where the rotation moment Ma is smaller than the rotation tensile force by the weight of the hand piece 40, so that the operability of the hand piece 40 is improved.

The prescribed range of angles from the most upright state in which the rotation tensile force and the rotation moment Ma are set such that the protect pole 20 is easily recovered to the most upright state is labeled as a "recovery range". The prescribed range of angles from the most inclined state in which the rotation tensile force and the rotation moment Ma are set such that the impact acting on the hand piece 40 when the hand piece 40 falls is nullified or alleviated is labeled as an "alleviation range". In this embodiment, the range of angles of the protect pole 20 from 50 degrees to 60 degrees is the using range, the protect pole 20 is at an angle of 82 degrees in the most upright state, and the protect pole 20 is at an angle of 40 degrees in the most inclined state. Thus, the alleviation range is the range of angles of the protect pole 20 from 40 degrees to 50 degrees, and the recovery range is the range of angles of the protect pole 20 from 60 degrees to 82 degrees.

When the eccentric length X1 is constant, namely, when the radius of a circle is constant as in the phantom eccentric circle Hc centered around the rotation center C shown in FIG. 8(b), the rotation tensile force increases linearly in accordance with the inclination and rotation angle of the protect pole 20 (reference tensile force P1 shown in FIG. 9(a)).

The protect pole 20 of the laser device 1 is tapered, namely, becomes thinner toward the tip thereof as shown in FIG. 9(b). Therefore, as the inclination angle increases (as the angle of the protect pole 20 in the counterclockwise direction decreases), the bending of the protect pole 20 becomes slower, namely, the radius of the arc becomes larger, like in the case of a fishing rod. Therefore, the distance forming the rotation moment Ma increases. As a result, as shown in FIG. 9(a), the rotation moment Ma exhibits a generally cos-shaped curved line.

The linear reference tensile force P1 and the generally cos-shaped curved rotation moment Ma are overlapped. When the reference tensile force P1 is larger than the rotation moment Ma, the reference tensile force P1 as the rotation tensile force is larger. Therefore, the force for recovering the protect pole 20 to the most upright state acts on the protect pole 20. By contrast, when the rotation moment Ma is larger than the reference tensile force P1, the rotation moment Ma as the rotation tensile force is larger. Therefore, the force for further inclining the protect pole 20 acts on the protect pole 20. When the rotation moment Ma is smaller than the reference tensile force P1 by the weight of the hand piece 40, the protect pole 20 is put into a balanced state where the current state is maintained.

When the protect pole 20 is in the using range in which the reference tensile force P1 is larger than the rotation moment Ma, the eccentric distance X is set to be shorter than the radius of the phantom eccentric circle Hc, so that the force for recovering the protect pole 20 to the most upright state does not become excessive and the balanced state where the rotation moment Ma is smaller than the reference tensile force P1 by the weight of the hand piece 40 is provided (tensile points Y3 through Y5).

When the protect pole 20 is in the prescribed range of angles from the most upright state, namely, in the recovery range, and when the protect pole 20 is in the prescribed range of angles from the most inclined state, namely, in the alleviation range, the eccentric distance X is adjusted to be longer than the radius of the phantom eccentric circle Hc, so that the rotation tensile force is larger than the rotation moment Ma (tensile points Y1 and Y2).

As a result, the cam surface 62 having the tensile points Y1 through Y5 is shaped as described above, and thus a desired rotation tensile force (adjusted rotation tensile force P2 shown in FIG. 9(a)) with respect to the rotation moment Ma in accordance with the inclination angle of the protect pole 20 can be caused to act on the protect pole 20.

In addition, the tensile strength adjusting screw section 54 may be adjusted such that the reference tensile force P1 is increased to an adjusted reference tensile force P1α represented by the straight dashed line in FIG. 9(*a*). The adjusted reference tensile force P1α is obtained as a result of increasing the tensile force. Therefore, the eccentric distance X can be set from the relationship between the adjusted reference tensile force P1α adjusted by the tensile strength adjusting screw section 54 and the rotation moment Ma, and thus the shape of the cam surface 62 can be set.

Figure 10A:
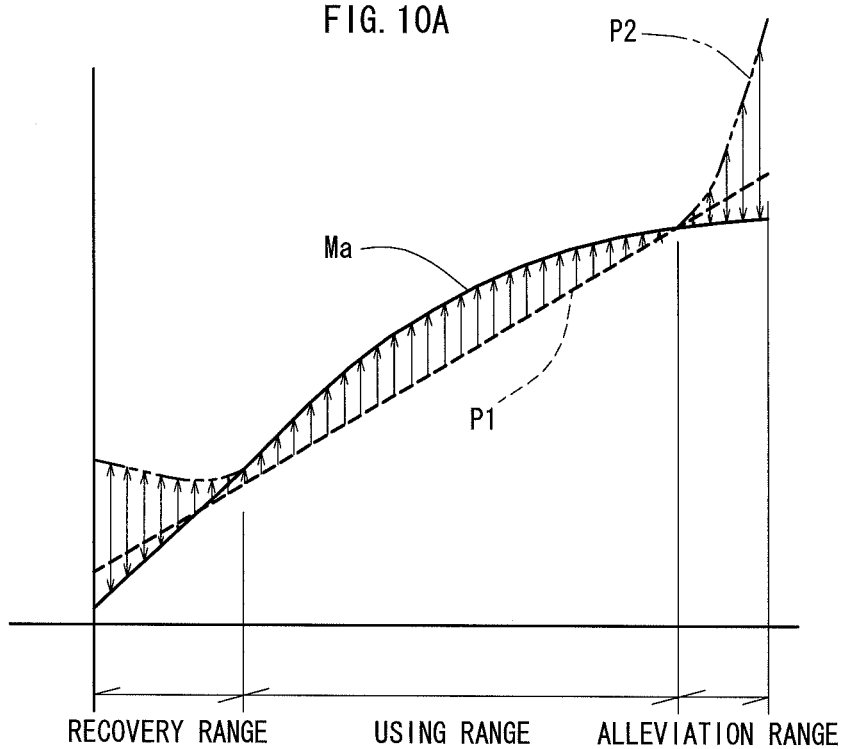
FIGS. 10A and 10B show adjustment of a rotation tensile force in a rotation support mechanism in a laser device according to another embodiment.
Figure 10B:
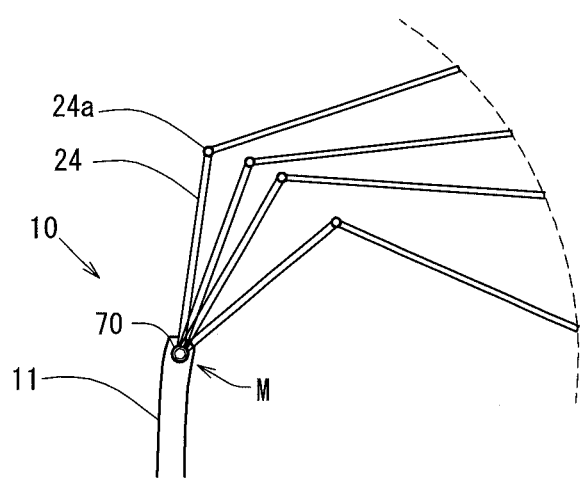

Another method of the adjustment is also available. As shown in FIG. 10(*b*), the protect pole 20 may be formed of a bent protect pole 24 with no deformability. The bent protect pole 24 includes a bending adjusting section 24*a*, at which the bending angle can be adjusted and fixed. In this case, the bent protect pole 24 rotates about the rotation axis AL with an equal radius. Therefore, the rotation moment Ma acting on the hinge 70 exhibits a generally sin-shaped curved line as shown in FIG. 10(*a*).

In order to put the protect pole 20 in the using range into the balanced state, the cam surface 62 having the eccentric distance X longer than the radius of the phantom eccentric circle Hc is formed in order to match the reference tensile force P1 to the rotation moment Ma.

The housing and the laser device main body according to the present invention correspond to the device main body 2 in the embodiment; and similarly, the arm section and the holding arm section correspond to the protect pole 20 and the bent protect pole 24;

the rotation axis corresponds to the rotation axis AL;

the rotation support mechanism corresponds to the rotation support mechanism M;

the urging force adjusting section corresponds to the cam surface 62 of the eccentric cam 60;

the urging section and the pulling and urging member correspond to the tensile spring 52;

the pulling and urging section corresponds to the tensile spring 52 and the coupling wire 53;

the cam corresponds to the eccentric cam 60;

the reference circle corresponds to the phantom eccentric circle Hc;

the rotation tensile force decreasing section and the balance adjusting section correspond to the tensile points Y3 through Y5;

the rotation tensile force increasing section corresponds to the tensile points Y1 and Y2;

the reference tensile force adjusting section corresponds to the tensile strength adjusting screw 54;

the inclination range regulation section corresponds to the maximum inclination angle adjusting section 74 and the maximum upright angle regulation section 75;

the lightguide section corresponds to the lightguide cable 30;

the laser medical care tool corresponds to the hand piece 40;

the balance adjusting section corresponds to the tensile points Y1 through Y5;

the generally upright state corresponds to the most upright state;

the most inclined state corresponds to the most inclined state;

the recovery rotation tensile force increasing section corresponds to the tensile point Y1;

the rising rotation tensile force increasing section corresponds to the tensile point Y2;

the rotation tensile force decreasing section corresponds to the tensile point Y4;

the top surface of the laser device main body corresponds to the top surface 2*a*; and the arm connection base corresponds to the rotation support base 10.

However, the present invention is not limited to the structure of the above embodiment and may be carried out in many other embodiments.

For example, in the above embodiment, the protect pole 20 is supported on the top surface 2*a* of the device main body 2 via the rotation support base 10 attached to the device main body 2, such that the protect pole 20 is inclinable. Alternatively, the protect pole 20 may be provided on the top surface 2*a* of the device main body 2 so that the protect pole 20 is directly supported by the top surface 2*a* of the device main body 2.

In the above embodiment, as the urging section for acting the rotation tensile force on the hinge 70 of the rotation support mechanism M, the tensile spring 52 coupled to the coupling wire 53 is used. Alternatively, the urging section may be only tensile spring 52 extending along the cam surface 62 of the eccentric cam 60, or may be an elastic member such as a rubber strip or the like instead of the tensile spring 52. In the above embodiment, the tensile force of the tensile spring 52 is caused to act on the hinge 70 as the rotation tensile force via the eccentric cam 60. Alternatively, the rotation tensile force by a recovery force of a twisting member may be caused to act on the eccentric cam 60, instead of using the tensile spring 52.

Figure 11:
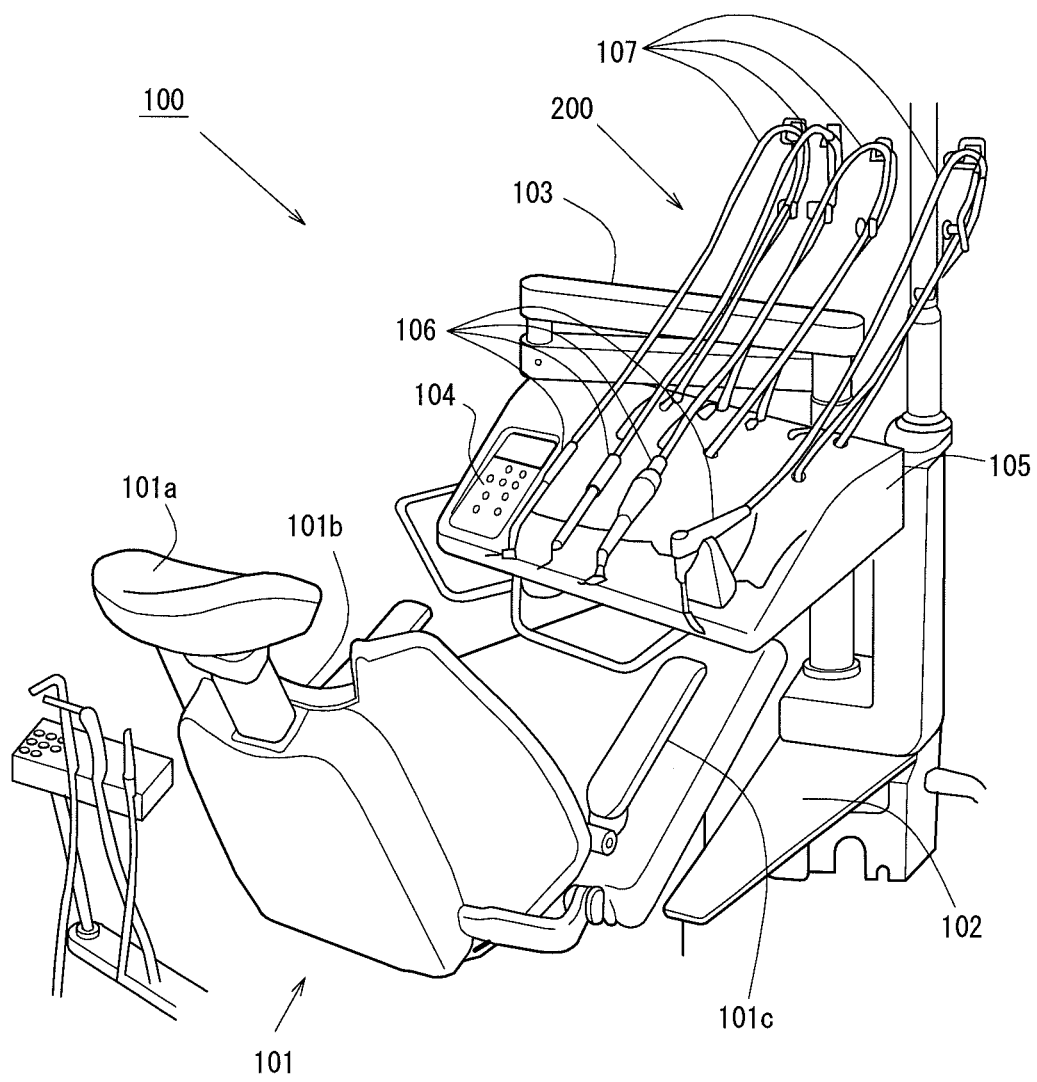
FIG. 11 is a partial isometric view of a chair unit including a rotation support mechanism.

In the above description, the rotation support base 10 of the laser device 1 includes the rotation support mechanism M, and the rotation tensile force of the tensile spring 52 is caused to act on the protect pole 20 for holding the lightguide cable 30, via the hinge 70 of the rotation support mechanism M. The rotation support mechanism M is not limited to being used for merely the laser device 1, and may be used for many other structures. For example, the rotation support mechanism M may be used for a flying arm section 200 of a chair unit 100 shown in FIG. 11 and FIG. 12. FIG. 11 is a partial isometric view of the chair unit 100 including the rotation support mechanism M, and FIG. 12 is a partially cut right side view of the flying arm section 200 in the chair unit 100 including the rotation support mechanism M.

As shown in FIG. 11, the chair unit 100, which is a dental care device, includes a seat 101 including a head rest 101*a*, a back rest 101*b* and an arm rest 101*c*, a flying arm attachment table 105 supported by an overarm 103 extending from an overarm attachment table 102 and having an operation panel 104 on a front surface thereof, tubes 107 each extending from the attachment table 105 and having any of various instruments 106 connected at a tip thereof, and the flying arm section 200, secured to the attachment table 105, for holding the tubes 107.

Figure 12:
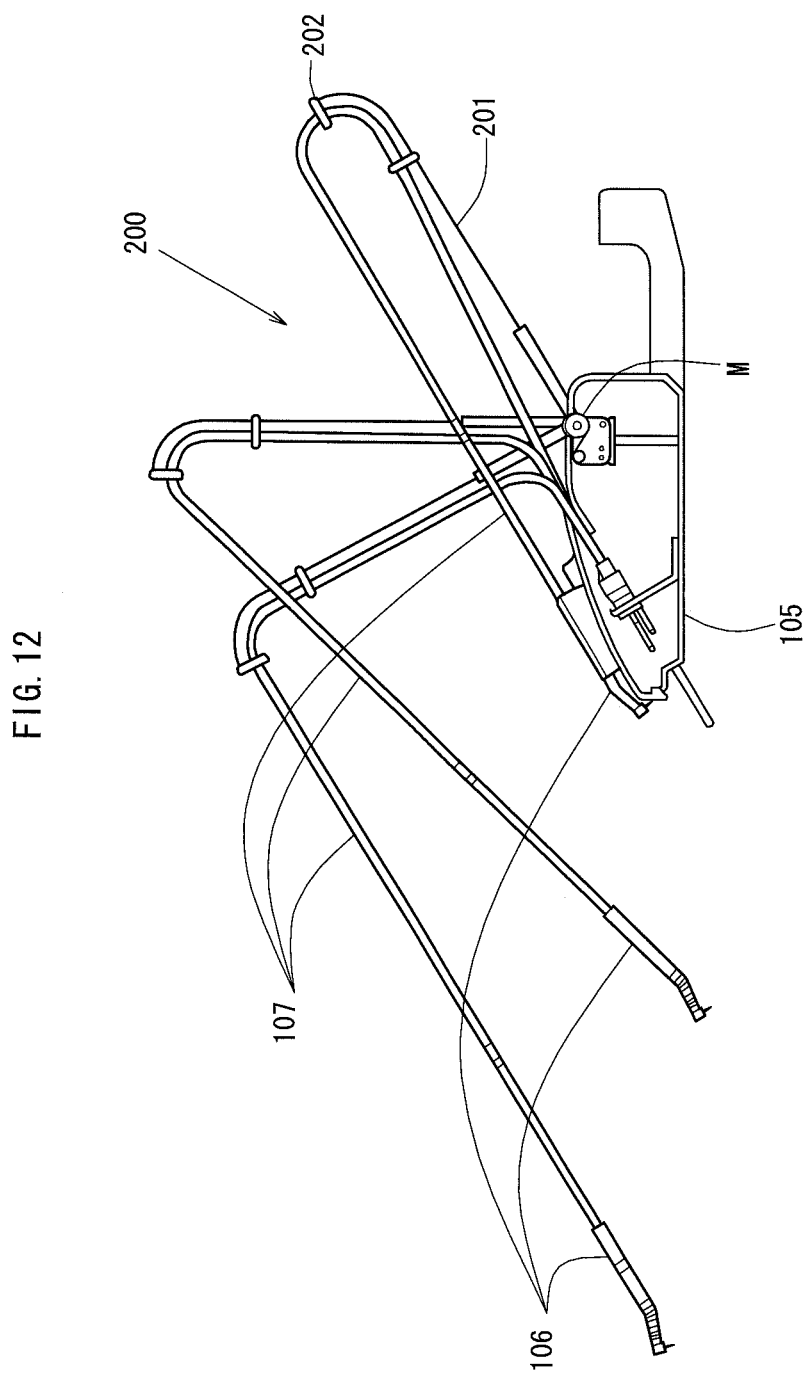
FIG. 12 is a right side view of a flying arm section of the chair unit including the rotation support mechanism.

As shown in FIG. 12, the flying arm section 200 extending from the attachment table 105 and having the tubes 107 attached thereto, the tubes 107 having any of various instruments 106 connected at a tip thereof, includes lengthy arm sections 201 for allowing the tubes 107 to stand, holding rollers 202, provided on the lengthy arm sections 201, for supporting the tubes 107 from a base to an intermediate position thereof, and the rotation support mechanism M associating with the pivoting of the lengthy arm sections 201. Therefore, the rotation tensile force can be adjusted by the cam surface 62 of the eccentric cam 60 and can be allowed to act on the inclinable and rotatable lengthy arm sections 201 in accordance with the inclination and rotation angle of the lengthy arm sections 201.

In this manner, the rotation support mechanism M may be used in any of various manners, for example, for the protect pole 20 of the laser device 1 or for the flying arm section 200 of the chair unit 100.

DESCRIPTION OF THE REFERENCE NUMERALS

- 1 . . . Laser device
- 2 . . . Device main body
- 2a . . . Top surface
- 10 . . . Rotation support base
- 20 . . . Protect pole
- 24 . . . Bent protect pole
- 30 . . . Lightguide cable
- 40 . . . Hand piece
- 52 . . . Tensile spring
- 53 . . . Coupling wire
- 54 . . . Tensile strength adjusting screw section
- 60 . . . Eccentric cam
- 62 . . . Cam surface
- 74 . . . Maximum inclination angle adjusting section
- 75 . . . Maximum upright angle regulation section
- AL . . . Rotation axis
- Hc . . . Phantom eccentric circle
- M . . . Rotation support mechanism
- X . . . Eccentric distance
- Y1-Y5 . . . Tensile point

What is claimed is:

1. A rotation support mechanism for supporting an arm section with respect to a housing such that the arm section is inclinable and rotatable about a rotation axis as a rotation center, the rotation support mechanism comprising:

an urging section for supplying the arm section with a rotation urging force for directing the arm section from an inclined state toward an upright state in accordance with an inclination angle of the arm section about the rotation axis as the rotation center; and an urging force adjusting section for adjusting the rotation urging force to a desired rotation urging force in accordance with the inclination angle, wherein the urging section includes a pulling and urging member including, at least in a part thereof a pulling and urging section having an urging force increasing in proportion to a tensile amount, one of two ends of the pulling and urging member is located on a side of one of the arm section and the housing, and the other of the two ends of the pulling and urging member is located on a side of the other of the arm section and the housing, and the urging force adjusting section includes a cam rotatable about the rotation axis as the rotation center along with an inclination and rotation motion of the arm section and comprising a cam surface along which a part of the pulling and urging member in a length direction from the one end to the other end is extended, wherein the tensile amount of the pulling and urging member is adjusted in accordance with an eccentric distance of the cam surface from the rotation axis such that rotation tensile force of the pulling and urging member is adjusted.

2. The rotation support mechanism according to claim 1, wherein the cam surface of the cam includes at least one of:

a rotation tensile force decreasing section, the eccentric distance of which from the rotation axis is formed to be shorter than a prescribed radius of a reference circle centered around the rotation axis and thus the tensile amount of the pulling and urging member is made smaller than a tensile amount by the reference circle, so that the rotation tensile force is made smaller than a reference rotation tensile force which is in accordance with the inclination angle based on the reference circle; and a rotation tensile force increasing section, the eccentric distance of which from the rotation axis is formed to be longer than the radius of the reference circle and thus the tensile amount of the pulling and urging member is made larger than the tensile amount by the reference circle, so that the rotation tensile force is made larger than the reference rotation tensile force.

3. The rotation support mechanism according to claim 1, further comprising a reference tensile force adjusting section for adjusting a length of the pulling and urging member with respect to a natural length thereof adjust a reference tensile force of the pulling and urging member.

4. The rotation support mechanism according to claim 1, further comprising an inclination range regulation section for regulating an inclination range of the arm section.

5. A laser device, comprising the rotation support mechanism according to claim 1, wherein:

the housing is a laser device main body that accommodates a laser light source;

the arm section includes a holding arm section for holding a flexible and lengthy lightguide section which is for transmitting laser light emitted from the laser light source to a tip of the lightguide section; and the rotation support mechanism supports the holding arm section with respect to the laser device main body such that the holding arm section is inclinable and rotatable.

6. The laser device according to claim 5, further comprising a laser medical care tool at a tip of the lightguide section, the laser medical care tool being for performing laser medical care by laser light irradiation;

wherein when the holding arm section is in an inclination angle range during use of the laser medical care tool, the cam surface has a balance adjusting section for adjusting the rotation tensile force to be larger or smaller than the reference rotation tensile force in accordance with a balance between the rotation tensile force and a weight of the laser medical care tool, so that an extra rotation tensile force does not act on the laser medical care tool.

7. The laser device according to claim 5, wherein in the case where a state where the holding arm section is in a generally upright state with respect to the laser device main body is a reference state, the cam surface has the rotation tensile force increasing section as a recovery rotation tensile force increasing section for, when the holding arm section is in a prescribed range of inclination angles from the generally upright state, making the rotation tensile force, for recovering the holding arm section from an inclined state to the generally upright state, larger than the reference rotation tensile force.

8. The laser device according to claim 5, wherein the cam surface has the rotation tensile force increasing section as a rising rotation tensile force increasing section for, when the holding arm section is in a prescribed range of inclination angles from a state in the vicinity of a most inclined state in a falling direction, making the rotation tensile force in a rising direction larger than the reference rotation tensile force.

9. The laser device according to claim 8, wherein the cam surface includes the recovery rotation tensile force increasing section, the balance adjusting section, and the rising rotation tensile force increasing section in this order from a rotation start direction to a rotation termination direction.

10. The laser device according to claim 9, wherein:
the holding arm section includes a bendable member having a bending deformability improved from a base end toward a tip thereof; and
the rotation tensile force decreasing section is included in at least a part of the balance adjusting section.

11. The laser device according to claim 5, further comprising an arm connection base on a top surface of the laser device main body, the arm connection base having the rotation support mechanism at a tip thereof and connected to the holding arm section via the rotation support mechanism; and
the arm connection base is rotatable in a generally horizontal direction with respect to the top surface of the laser device main body.

* * * * *